United States Patent [19]

Rodgers

[11] 3,994,630

[45] Nov. 30, 1976

[54] MONOROTOR TURBINE AND METHOD OF COOLING

[75] Inventor: Colin Rodgers, San Diego, Calif.

[73] Assignee: International Harvester Company, San Diego, Calif.

[22] Filed: Aug. 21, 1974

[21] Appl. No.: 499,246

[52] U.S. Cl. .......................... 417/407; 415/DIG. 1; 415/116
[51] Int. Cl.² ..................................... F04B 17/00
[58] Field of Search ............... 417/407; 415/DIG. 1, 415/115, 116

[56] References Cited
UNITED STATES PATENTS

| | | | |
|---|---|---|---|
| 1,926,225 | 9/1933 | Birmann | 417/407 |
| 1,959,703 | 5/1934 | Birmann | 417/407 |
| 2,390,506 | 12/1945 | Buchi | 417/407 |
| 2,410,259 | 10/1946 | Birmann | 415/DIG. 1 |
| 2,709,893 | 6/1955 | Birmann | 417/407 |
| 2,911,138 | 11/1959 | Birmann | 417/407 |
| 2,997,283 | 8/1961 | Segley | 415/DIG. 1 |
| 3,071,691 | 1/1963 | Haddad et al. | 417/407 |
| 3,173,241 | 3/1965 | Birmann | 417/407 |
| 3,365,892 | 1/1968 | Derderian | 417/407 |

FOREIGN PATENTS OR APPLICATIONS

| | | | |
|---|---|---|---|
| 1,380,267 | 10/1964 | France | 417/407 |

Primary Examiner—C. J. Husar
Attorney, Agent, or Firm—Matthew P. Lynch

[57] ABSTRACT

A gas turbine combining both monorotor and monostator elements is disclosed. The monostator element is disposed about the inside of the turbine housing and circumferentially about the outside of the monorotor element which is journaled for rotation in the turbine housing.

The cooling of the relatively hot turbine section of the monorotor is accomplished by a measured rate of heat conduction transfer from the turbine section to the compressor section of the monorotor and is further supplemented by disposing a blade tip fluid seal between the turbine rotor and compressor blade tips which are arranged in back-to-back relationship, leaking approximately 4% of the air leaving the compressor blade tips through the seal to the turbine rotor blade tips, forming the leaked air into a film on the surface of the turbine rotor body and directing the air film from the turbine rotor blade tips along the turbine rotor body to the turbine rotor hub, and thereafterwards not producing a turbine rotor metal temperature exceeding the selected operational temperature of the metal forming the turbine rotor.

11 Claims, 10 Drawing Figures

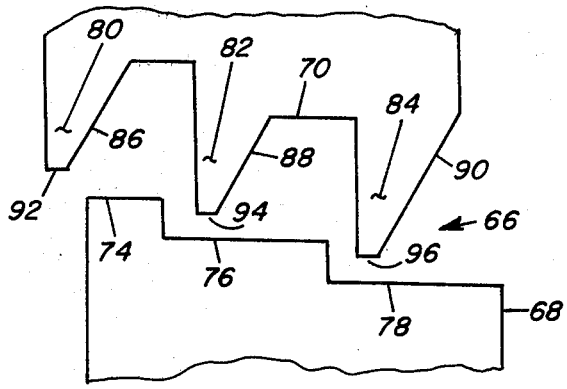
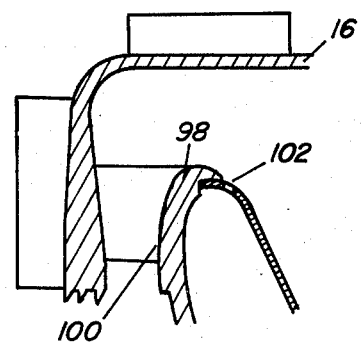
FIG. 5
FIG. 9
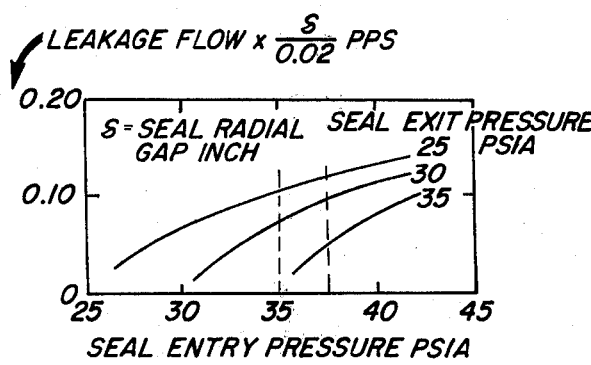
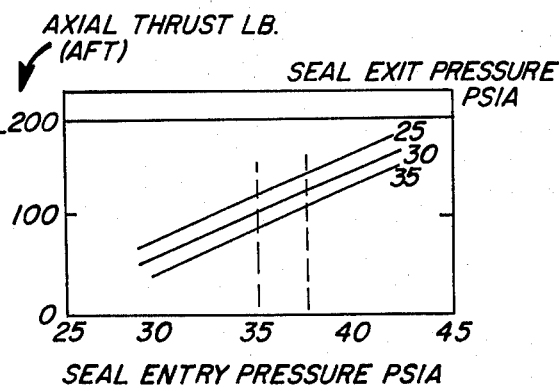
FIG. 6
FIG. 7
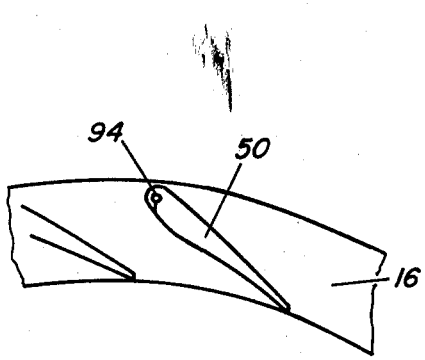
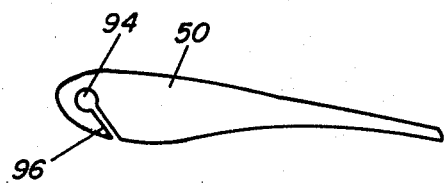
FIG. 8
FIG. 10

MONOROTOR TURBINE AND METHOD OF COOLING

BACKGROUND OF THE INVENTION

For many years it has been generally acknowledged throughout the gas turbine industry that the lowest cost engine configuration is that utilizing a single-stage radial compressor and turbine mounted back-to-back on a common overhung, cantilevered shaft.

Continued development over the years of this engine arrangement has led to increased pressure ratios and turbine inlet temperatures to as high as 6.0:1 and 1,700° F, respectively.

In order to increase operating turbine inlet temperatures beyond 1,700° F, methods of cooling the turbine rotor were required. After studying many cooling methods, it was determined that a monorotor arrangement in which the two rotors were integrated and the hot section conduction cooled by the cold compressor heat sink offered substantial advantages.

Several low-temperature, low pressure ratio monorotor gas turbines were developed during the 1950's. However, the development of small single-stage centrifugal compressors and radial inflow turbines has been guided primarily by the priority of low manufacturing cost rather than operational efficiency or maximum performance. In recent years, however, the need for optimum operational efficiencies and/or maximum performance has continued to become an increasingly greater factor in the gas turbine engine field. Projections concerning the availability of gas, oil and other hydro carbon fluids indicate an ever-increasing demand for an ever-decreasing supply. This, of course, means that the relative value of this factor is, and will continue to be, an important element in the gas turbine engine selection process.

Increased cycle efficiencies can be obtained by increasing turbine inlet temperature but significant consideration to the maximum allowable metal temperature of the turbine rotor is necessary. In general, the life expectancy of a high temperature turbine stage is determined by the peak metal temperature and distribution, which, of course, govern blading oxidation and thermal fatigue characteristics.

Stress rupture life is also dependent upon the temperature of the metal. Of primary importance is the allowable metal temperature of the monorotor. High-strength, high-temperature metals are now available that are capable of withstanding rotor metal temperatures of about 1,500° F. Higher metal temperatures may be tolerated in the lower stressed turbine nozzle where metal temperatures of 1,800° F are acceptacle. Consequently, if the monorotor metal temperature is maintained below 1,500° F, no additional cooling will be required.

Further, it is obvious that the temperature within the monorotor will not be entirely uniform. Axial and radial temperature gradients will exist due to:
1. The finite width of the disc separating the compressor and turbine;
2. The height and taper ratio of the turbine and compressor blades;
3. The existance and use of additional heat sinks, such as the shaft; and
4. The effects of combustor exit temperature variations.

The present invention as herein and hereinafterwards disclosed, in the main, overcomes many of the problems mentioned hereinbefore of the monorotor gas turbine engine designs by providing a uniquely structured gas turbine utilizing a novel turbine rotor cooling technique.

SUMMARY OF THE INVENTION AND OBJECTS

A high temperature, low cost monorotor and monostator gas turbine in which a single-stage centrifugal compressor and radial inflow gas turbine are integrated in back-to-back relationship wherein the hot turbine section is directly cooled by heat conduction to the relatively cold compressor section.

In order to limit the monorotor's metal temperatures to an acceptable level while imposing the least possible thermodynamic and aerodynamic penalties on the engine, a method of cooling the turbine rotor is needed.

Cooling of the turbine is accomplished by conduction and supplemented by leaking a portion of the air exiting the compressor across the monorotor blade tip seal into the inlet of the turbine. This will cause the leaked air to flow across the turbine body thereby cooling it. However, it must be realized that the optimum amount of coolant should be used at the lowest possible pressure so as to minimize the heat extracted from the cycle and, thereby minimize the thermodynamic penalties. Excessive cooling of the turbine will decrease turbine efficiency because of the thermodynamic penalties involved.

Additionally, a monostator is employed wherein the turbine nozzle and compressor diffuser are formed as an integrated structure with the hot turbine nozzle being conduction cooled by the relatively cold compressor diffuser section of the monostator.

A method for optimizing the operation of a high temperature monorotor gas turbine comprising the steps of disposing a blade tip fluid seal between the turbine rotor and compressor blade tips which are arranged in back-to-back relationship, leaking approximately 4% of the air leaving the compressor blade tips through the seal to the turbine rotor blade tips, forming the leaked air into a film on the surface of the turbine rotor body and directing the air film from the turbine rotor blade tips along the turbine rotor body to the turbine rotor hub, and thereafterwards not producing a turbine rotor temperature exceeding the selected operational temperature of the metal forming the turbine rotor has been developed.

It is an object of the present invention to provide a method for cooling a high temperature monorotor gas turbine without providing large amounts of cooling air which would significantly reduce turbine efficiency.

Another object of the invention is to provide a method for cooling a high temperature monorotor gas turbine whereby a significant reduction in size and weight of small gas turbines can be effected.

A still further object of the subject invention is to provide a method of cooling a high temperature nozzle section of a gas turbine.

Still another object of the present invention is to provide an improved cooling flow technique permitting increased turbine inlet temperatures which yields higher engine performance.

A prime object of the invention is to provide a monorotor turbine cooling method which permits the use of higher turbine inlet temperatures, above 2,000°

F, without any significant performance penalties stemming from cooling airflow energy losses.

Another important object of the invention is to provide for a significant reduction in both size and weight of relatively small gas turbines of the monorotor variety.

A still further primary object of the present invention is to provide a monorotor and monostator gas turbine capable of operation in the high-temperature region of about 2,000°–2,500° F.

The above and other objects, features and advantages of the present invention will be apparent from the following detailed description of a preferred embodiment thereof taken in conjunction with the accompanying drawings.

BRIEF DESCRIPTION OF THE DRAWINGS

FIG. 5 is an elevational section of the three gland labryinth seal disposed between the monostator and the monorotor.

FIG. 6 is a chart showing the blade tip leakage flow as related to entry and exit pressures on the seal.

FIG. 7 is a chart showing the relationship between the axial thrust as related to entry and exit seal pressures.

FIG. 8 is a partial section of the end view of the compressor diffuser illustrating a means for reducing hotspots on the individual diffuser elements.

FIG. 9 is a partial sectional view of the monostator element illustrating a means for film cooling the monostator.

FIG. 10 is an enlarged sectional view of the individual diffuser element shown in FIG. 8.

DESCRIPTION OF THE PREFERRED EMBODIMENT

Figure 1:
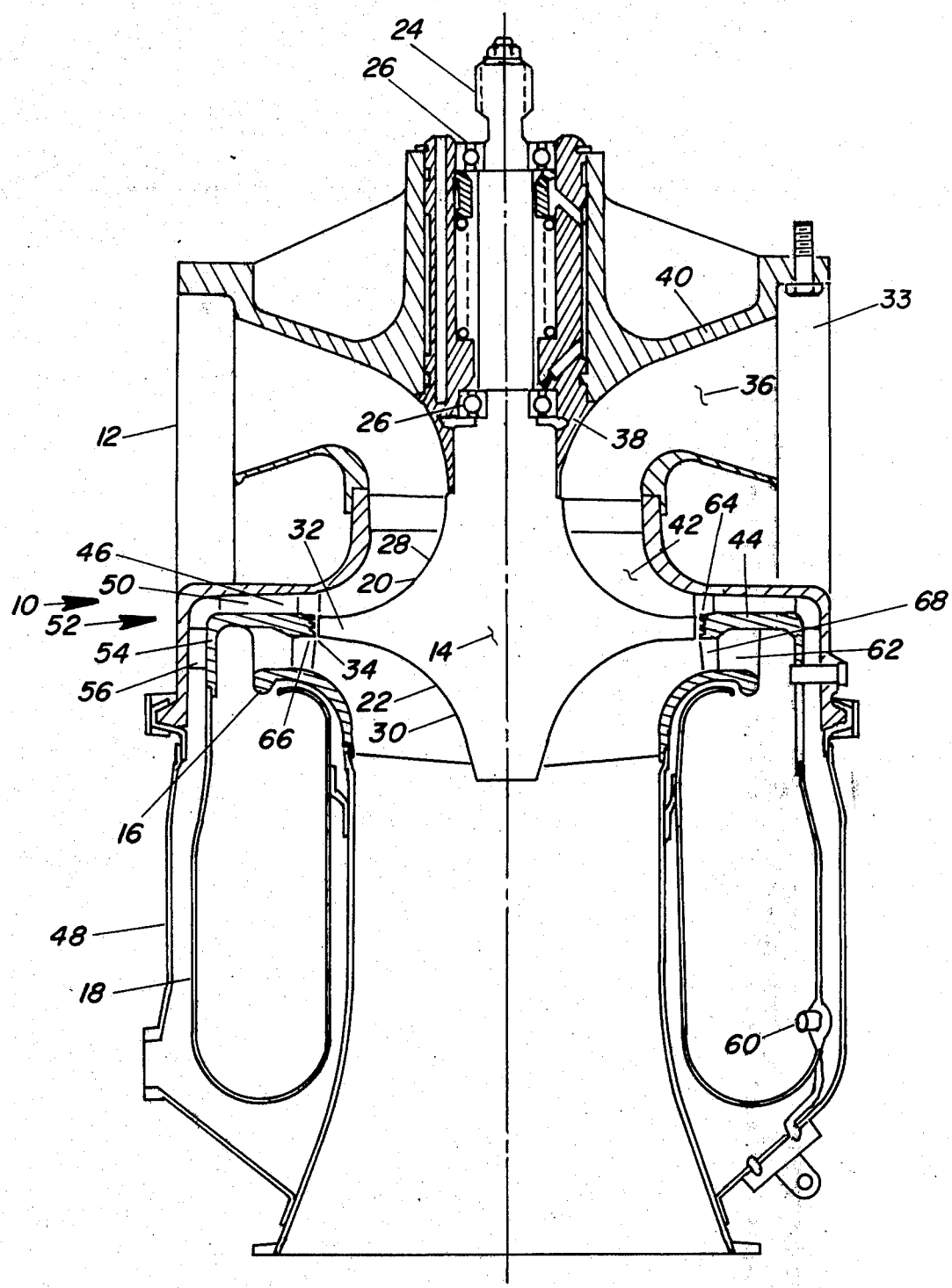
FIG. 1 is a side elevational view in section of a monorotor gas turbine as utilized in conjunction with the present invention.

With reference to the drawings, and more particularly, to FIG. 1, a gas turbine-type internal combustion engine is generally indicated at 10. The engine 10, basically, comprises a housing 12, a monorotor element 14, a monostator element 16 and a combustor 18.

The monorotor 14, in turn, comprises a centrifugal compressor 20 and a radial inflow turbine 22. The monorotor 14 is supported within the housing 12 and is journalled for rotation therein by means of a shaft 24 cantilever-mounted in an overhung fashion within the shaft bearings 26. The mounting of the monorotor 14 is effected so as to place the shaft bearings 26 where the temperature is at a minimum and, preferably, approximating ambient atmospheric temperature. In addition, the mounting of the shaft 24 is such that heat flow from the hot turbine 22 portion of the monorotor 14 to the bearing 26 by radiation, conduction and convection is minimized.

Heat flow to the bearings 26 from the hot turbine 22 portion is further minimized and the heat generated by the bearings 26 themselves is carried away by flow of cooling air passed over the housing 38 of bearings 26, as for example the air passing into intake opening 36 past member 40 and bearing housing 38.

In the monorotor configuration, the monorotor carries an equal number of compressor blades 28 on one axial side and turbine blades 30 on its other axial side. The reason for this will become apparent as the description of the invention continues hereinafterwards. The compressor said turbine blades 28,30 are disposed in-line at the rotor tip 32 thereby permitting a direct path for heat conduction.

As clearly shown in FIG. 1, the compressor portion of the housing 10 is indicated generally at 33 and is provided with an air intake opening 36 in the central portion of which there is axially located a housing 38 for the mounting of the shaft 24, this latter housing 38 being supported within the opening 36 by member 40. The monostator 16 is disposed about the inside of the housing 10 and forms an annular body 54 which is circumferentially-disposed about the monorotor 14. The body 54 is adapted to provide an outer wall for a compressor passage 42 and a substantially radial wall 44 forming one boundary of a vaned diffuser passage 46 which discharges into a scroll 48 surrounding an annular combustor 18 surrounding the monorotor 14.

Figure 3:
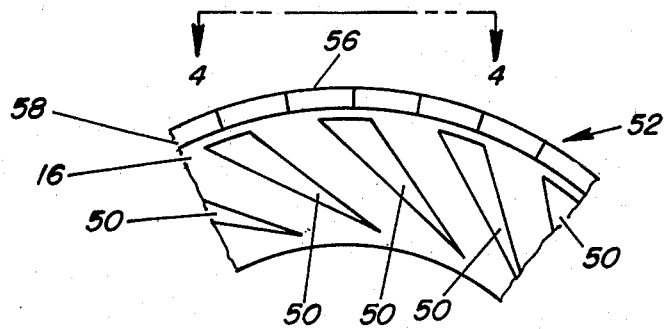
FIG. 3 is a partial section of the end view of the compressor diffuser depicting the orientation of the diffuser elements.
Figure 4:
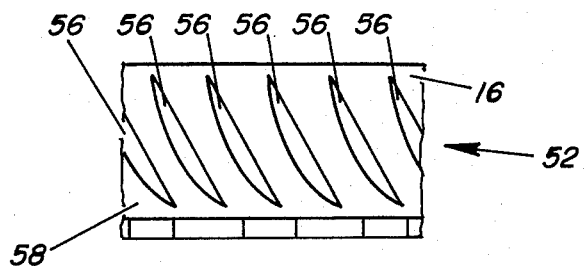
FIG. 4 is a sectional view taken along 4-4 of FIG. 3 depicting a portion of the compressor diffuser section.

Now referring also to FIGS. 3 and 4, the compressor diffuser, generally indicated at 52, has stationary vanes 50 which are formed as an integral part of the body 54 of the monostator 16. Additionally, stationary vanes 56 are provided about the outer periphery 58 of the monostator 16.

Still referring to FIG. 1, the operation of the engine may be briefly described as follows. Air enters the inlet passage 36, passes into the compressor blading 28 and is discharged into the compressor diffuser 52. This compressed air then is directed into the scroll 48 via the peripherally-disposed vanes 56 surrounding the annular combustor 18. Fuel is injected in an atomized form into the combustor 18 via a fuel injector member 60 and becomes thoroughly mixed with the compressed air therein.

A spark plug (not shown) mounted within the combustor 18 is activated to ignite the mixture of fuel and compressed air within the combustor 18. The hot gases produced by said ignition and subsequent combustion process are directed into the turbine nozzle 62 and engage the turbine blading 30. The turbine nozzle 62 is formed as an integral part of the monostator 16 assembly.

Figure 2:
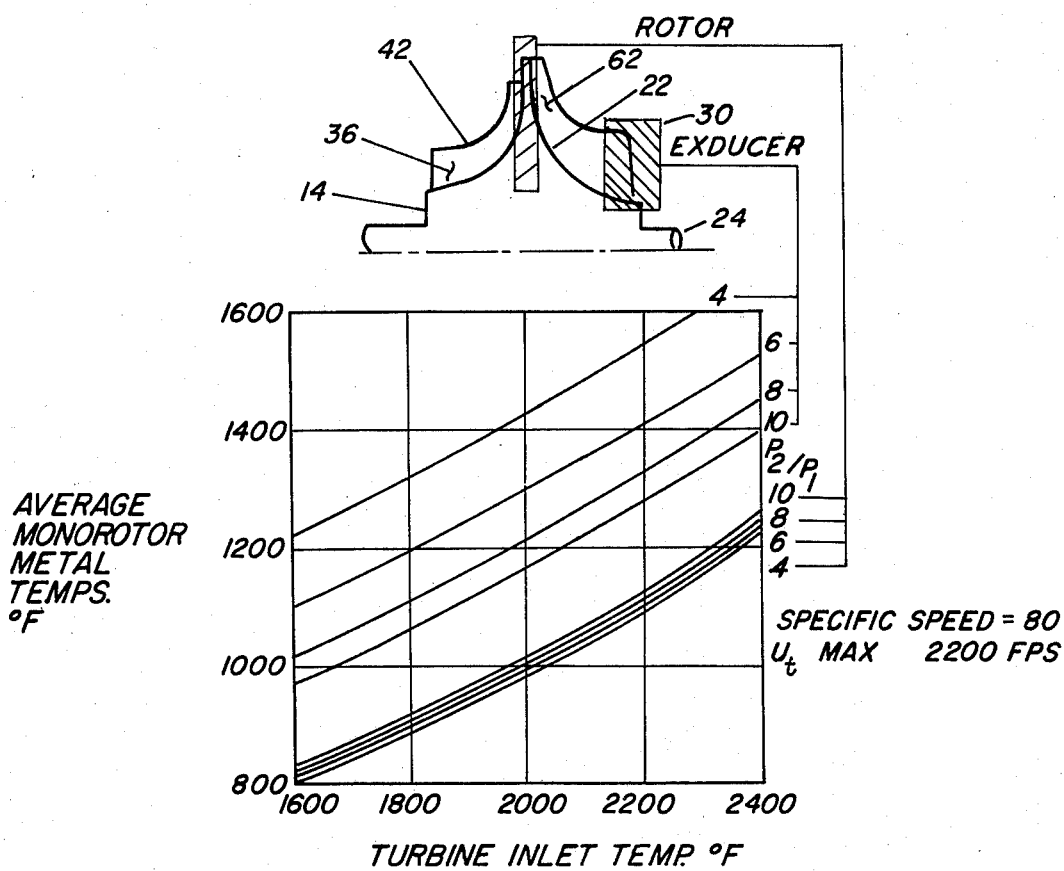
FIG. 2 is a chart depicting calculated Average Monorotor Metal Temperatures (° F) versus Turbine Inlet Temperatures (° F) along various pressure ratios, $P_2/P_1$, for both the rotor and exducer portions of the monorotor.

It should be noted at this time that due to the monostator configuration, a portion of the monostator 16 is, relatively speaking, much colder than the other portion, see FIG. 2. To be more specific, the turbine nozzle 62 is relatively hot compared to the compressor diffuser 52. In order to promote improvement of the heat conduction path for the monostator 16 component, the number of compressor diffuser vanes 50 is made equal to the number of turbine vanes 68.

Similarly, adoption of an equal number of impeller blades 28 for the compressor 20 contains an equal number of turbine rotor blades 30 for improving the heat conduction path from the relatively hot turbine 22 portion of the monorotor 14 to the relatively cold compressor 20 portion thereof.

Although the transfer of heat to the compressor reduces the effective cycle temperature ratio for a given maximum temperature, it does not necessarily decrease the compressor efficiency. For a given compressor tip speed, heat addition decreases the pressure ratio but the internal or hydraulic efficiency remains essentially unchanged.

In fact, if the compressor 20 of a monorotor 14 were specifically matched for heat addition, a slight efficiency increase could result from the elimination of back-shroud disc friction. The compressor 20 will, of course, require a slightly higher tip speed to maintain the unheated pressure ratio.

It is important in operation to avoid actual contact or rubbing between the bodies of the monorotor 14 and the monostator 16. To eliminate this rubbing, the monorotor 14 and the monostator 16 must be separated by a non-contact type seal, such as the labryinth seal indicated at 66 in FIG. 1 and shown in enlarged detail in FIG. 5.

Referring to FIG. 4, the labryinth seal 66 comprises a moving member 69 and a stationary member 70. The moving member 69 is secured to the tip 32 of the monorotor 14 in circumferential relationship thereto and stepped to form individual lands 74,76,78 for the seal 66. The stationary member 70 is mounted about the inside of the monostator 16 and is characterized by three knife blade-like projections 80,82,84 with backside ramps 86,88,90. Each of the tips 92,94,96 are disposed in equidistant fashion from the lands 74,76,78 respectively.

A non-rubbing seal 66 is required at the monorotor tip 32 to minimize and control the amount of compressed air which is permitted to leak from the compressor 20 portion to the turbine 22 portion of the engine 10, see FIGS. 6 and 7. Should this leakage be excessive, a mismatch would result between the compressor and turbine components and also produce potentially unsafe combustor temperatures. However, a metered quantity of tip leakage from such a non-contact type labryinth seal 66, can be used to advantage in providing film cooling of the hot turbine side of the tip 32 and improving the efficiency of the compressor 20 by reducing recirculation effects at the compressor impeller side of the tip 32. The metering of the tip leakage is determined by: (1) the static pressure differential across the compressor 20 and the turbine rotor sides of the tip 32; (2) design of the labryinth seal 66; and (3) differential thermal expansions of the monorotor 14 and the monostator 16. The rotor tip 32 static pressures are influenced by the blading reaction which, in turn, also effects the aerodynamic axial end thrust of the monorotor 16 assembly. The influence of the rotor tip 32 static pressures on both leakage flow and axial end thrust have been calculated for a stepped, labyrinth seal 66 with three glands.

For example, for a stepped labyrinth seal 66 with the following dimensions as shown in FIG. 5: (1) radial gap between the lands 74,76,78 and projections 80,82,84 of from 0.02 to 0.15 inches; (2) step height of 0.03 inches; (3) land table length of 0.055 inches, 0.123 inches, and 0.122 inches for 74,76,78 respectively; (4) blade depth of 0.07 inches for blade-like projections 80,82,84, respectively; (5) a backside ramp angle of 30 degrees for ramps 86,88,90 and (6) an axial offset of from 0.020 to 0.030 inches and with an expected static pressure of 35 to 37 pounds per square inch absolute (psia) on the compressor 20 side of the tip 72 and a static pressure of 25 psia on the turbine 22 side of the tip 72, the air leakage flow with a 0.02 inch hot running radial clearance would be 0.11 pounds per second (pps).

Since leakage flow is essentially directly proportional to the radial gap between the projections 80,82,84 and the lands 74,76,78, leakage flow may be increased by merely increasing the radial gap.

On the other hand, several methods of reducing the leakage rate are possible, including buffering of the seal 66 with higher pressure air from the compressor diffuser 52, or ramp devices, such as the backside ramps 86,88,90, to raise the effective pressure on the turbine 22 side of the tip 32 to some fraction of incident stagnation pressure.

It should be noted at this time that due to the relatively large axially disposed displacement of the monorotor 14 and the monostator 16 in the hot running position, the seal 66 is initially assembled with a cold axial offset of from 0.020 to 0.030 inch.

In order to operate the monorotor gas turbine engine 10 in an efficient manner, it should be operated as a high-temperature (2,000 to 2,500° F) device. Present metals which are deemed useful for monorotor 14 construction are limited to operation within this temperature region. In order to accomplish this, the turbine bladed section 30 of the monorotor 14 must be cooled to insure that such thermal limits are not exceeded. Should these limits be exceeded, failure may be precipitated or life expectancy significantly reduced.

While cooling of the turbine section 22 is necessary, should excessive cooling (overcooling) of the turbine 22 occur, overall efficiency and performance will be significantly affected in a negative fashion. The objective is to limit metal temperatures of the turbine 22 rotor to an acceptable level while imposing the least possible thermodynamic penalties on the engine 10. Thermodynamic penalties are minimized by using the optimum amount of coolant, by delivering it to the area to be cooled at the lowest possible pressure, and by minimizing the heat extracted from the cycle.

Referring now to FIG. 2, if may be seen that an assessment of the maximum temperature gradients that could exist in the turbine section 22 is possible if it is assumed that the heat flux from the turbine 30 to the monorotor or main rotor 14 disc is negligible. Monorotor 14 metal temperatures under the conditions of the chart of FIG. 2, indicate that with a turbine inlet temperature of 2,400° F the monorotor disc metal temperature of the turbine portion 30 could be as high as 1,600° F, depending on the pressure ratio and the heat flux to the main rotor 14 disc.

It should be noted at this time that the average metal temperature (which forms the vertical axis of the chart of FIG. 2) will tend to approach the average of the turbine 22 and the compressor 20 relative air temperatures.

In summarizing the results as indicated in the chart of FIG. 2, it is shown that the monorotor 14 average metal temperature could be as low as half the turbine inlet temperature for the range of pressure ratios considered. This is an extremely significant result, because large amounts of turbine cooling flow would normally be required to achieve such a low metal temperature with existing methods.

To achieve the proper amount of turbine cooling and also provide a non-contacting turbine-compressor tip seal 66 between the monorotor 14 and monostator 16, it has been discovered that the seal 66 air flow leakage from the compressor 20 to the turbine 22 section can be used to supplement the cooling effect of conduction heat transfer from the hot turbine 22 section to the relatively cool compressor 20 section of the monorotor 14. This amount of leakage flow is gainfully employed to provide film cooling of the turbine 22. This leakage flow, carrying angular momentum imparted by the compressor blading 28, would leak over the rotor tip 32 and down along the turbine hub where its engegy would be extracted by the turbine blades 30. Essentially, all the leakage flow energy is thereby utilized.

The monostator 16 has many thermal problems which are similar in nature to the monorotor element 14. Referring now specifically to FIGS. 8 and 10, a compressor diffuser vane 50 is illustrated having a transverse passageway 94 therein with a second passageway 96 joined with the passageway 94 so as to be placed in fluid communication therewith. Utilization of the passageways 94, 96 at the point of the vane 50 where excessive thermal excursions are likely to occur, provides air access thereinto whereby the vane 50 may be cooled to the desired lower temperature.

Additionally, the nozzle outer shroud lip 98 and adjacent vane leading edge 100 are also typically found to be hot spots with estimated temperatures approaching 1,900° F. By means of a plurality of apertures 102 disposed thereabout and therethrough, a cooling film of air can be directed thereover as depicted in FIG. 9 to reduce the temperature to the desired temperature.

Consequently, it may be seen that the principal advantage of the monorotor-monostator concept is its ability to operate at high turbine inlet temperatures and thus provide high specific power outputs, with relatively low manufacturing costs. High specific power engines are required for most airborne applications; for prime movers such as turbojet, turbofan and turboprop engines as well as auxiliary power units.

While the preferred embodiment of the present invention has been described, it should be apparent to skilled-in-the-art persons that other modifications may be performed without departing from its spirit and scope. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Accordingly, what is claimed as novel and desired to be secured by Letters Patent of the United States is:

1. A radial gas turbine-compressor, comprising:
   a. a monorotor element having a hub, said hub having a front side and a back side, said front side having compressor blading thereon, said compressor blading on said hub functioning as a radial compressor rotor and said back side having turbine blading thereon, said turbine blading on said hub functioning as a radial-inflow gas turbine rotor;
   b. mounting means for overhung mounting of said monorotor element, said mounting means comprising:
      a housing disposed about said monorotor element and having a first portion thereof disposed in justaposition to said front side of said hub and a second hub adjacently disposed to said front portion and extending outwardly in radially directed fashion from said first portion and disposed in substantially parallel relationship to said hub and further having a third portion perpendicularly disposed to said second portion and arranged in substantial coaxial relationship to said hub of said monorotor element;
      a shaft fixedly disposed on said hub and projecting outwardly from the center of said front side thereof;
      a bearing assembly wherein said shaft is rotatably disposed, said bearing assembly at least being partially located within the hub at the front side thereof carrying the compressor blading and supporting the hub on the shaft, said bearing assembly being fixedly mounted to said housing and supported thereby;
   c. means within said first-mentioned housing for directing a flow of cooling air about said bearing assembly externally thereof;
   d. a combustor means;
   e. a monostator element secured to said housing and circumferentially disposed about said hub of said monorotor in non-contacting relationship thereto, said monorotor having a first portion disposed in spaced-apart, parallel relationship to said second portion of said housing by a plurality of stationary diffuser vanes disposed therebetween thereby forming a first passageway for receiving compressed air from said compressor blading and further having a second portion disposed in spaced-apart, parallel relationship to said third portion of said housing by a plurality of stationary diffuser vanes disposed therebetween thereby forming a second passageway for receiving compressed air from said first passageway and for directing said compressed air to said combustor means, and further having a third passageway therein, said third passageway having a portion of its wall in common with said first passageway in said monostator element, said third passageway coupled to the output of said combustor for receiving hot gases therefrom and directing said hot gases into engagement with said turbine blading; and
   f. means depending from said common wall between said first and third passageways of said monostator and extending inwardly in a radial fashion to form a non-contacting, labyrinthtype seal between said compressor and said turbine sections, said seal comprising:
      a plurality of steps circumferentially disposed about said hub of said monorotor element,
      a plurality of blade-like projections equal in number to said plurality of steps and depending from said common wall between said first and third passageways of said monostator, the ends of said projections being disposed in contiguous, non-contacting equidistant relationship to said lands of said steps and each of said projections having a first uniplanar surface thereon facing said compressor blading and wherein each said first uniplanar surface lies in a different plane, said planes disposed in spaced-apart, parallel relationship to each other and disposed in perpendicular relationship to the rotational axis of said hub, said projections each further having a second uniplanar surface thereon forming a backside ramp which is disposed at an angle of 30 degrees with respect to said planes of said first uniplanar surface, said seal leaking approximately 2 to 4 percent of said compressed air exiting said compressor blading.

2. The gas turbine-compressor of claim 1, wherein the number of said steps on said monorotor hub and the number of said projections depending from said monostator is three.

3. The gas turbine-compressor of claim 2 wherein said ends of said projections are spaced-apart from said lands on said steps by 0.015 to 0.20 inches.

4. The gas turbine-compressor of claim 3, wherein said ends of said plurality of projections have lands thereon.

5. The gas turbine-compressor of claim 4, wherein each of said lands on the ends of said plurality of projections are equal in area.

6. The gas turbine-compressor of claim 5, wherein each of said equal-area lands have a transverse measurement between said first and second uniplanar surfaces of from 0.010 to 0.015 inches.

7. The gas turbine-compressor of claim 6, wherein said first uniplanar surfaces on said projections are axially-offset from each of said corresponding uniplanar surfaces of said corresponding steps, each of said uniplanar step surfaces being disposed in spaced-apart parallel planes disposed in perpendicular relationship to said totational axis of said monorotor hub, by 0.020 to 0.030 inches.

8. The gas turbine-compressor of claim 7, wherein the height of each of said steps on said monorotor hub relative to the plane of said land of said adjacently-disposed step is 0.030 inches.

9. The gas turbine-compressor of claim 1, further comprising means for cooling said stationary compressor diffuser vanes.

10. The gas turbine-compressor of claim 9, wherein said means for cooling said stationary compressor diffuser vanes comprises a plurality of stationary compressor diffuser vanes, each having a first passageway therein transversely disposed to the longitudinal axis transversely disposed to the longitudinal axis of said first passageway and in fluid communication therewith.

11. A radial gas-turbine compressor, comprising:
a. A monorotor element having a hub, said hub having a front side and a back side, said front side having compressor blading thereon, said compressor blading on said hub functioning as a radial compressor rotor and said back side having turbine blading thereon, said turbine blading on said hub functioning as a radial-inflow gas turbine rotor;
b. mounting means for overhung mounting of said monorotor element, said mounting means including a bearing assembly for rotatably mounting said monorotor element;
c. a monostator element secured to said housing and circumferentially disposed about said hub of said monorotor in non-contacting relationship thereto, said monostator having an inlet housing connected thereto for directing a flow of inlet cooling air about said bearing assembly, said monostator element having a plurality of stationary diffuser blades disposed adjacent said monorotor to form a first passageway for receiving compressed air from said compressor blading for connection to a compressed air passageway;
d. a combustor for receiving hot compressed air from the compressed air passageway and burning fuel therein and having a hot gas passageway for directing hot gases past a shroud lip into said compressor blading;
e. means for cooling said monostator,
a plurality of holes through said shroud lip, wherein said holes provide for fluid communication between said first passageway in said monostator for receiving compressed air from said compressor blading around said combustor.

* * * * *